C. A. WELLS.

ELECTROMAGNETIC TRACTION DEVICE AND EMERGENCY BRAKE.

APPLICATION FILED SEPT. 27, 1906.

Reissued Apr. 27, 1909. 12,950.

Witnesses:

Geo. E. Garrett

Alex. Scott

Inventor:

Charles A. Wells, by W. T. Howard

Att'y.s.

THE NORRIS PETERS CO., WASHINGTON, D. C.

UNITED STATES PATENT OFFICE.

CHARLES A. WELLS, OF CHICAGO, ILLINOIS, ASSIGNOR TO MAGNETIC EQUIPMENT COMPANY, A CORPORATION OF SOUTH DAKOTA.

ELECTROMAGNETIC TRACTION DEVICE AND EMERGENCY-BRAKE.

No. 12,950. Specification of Reissued Letters Patent. Reissued April 27, 1909.

Original No. 771,193, dated September 27, 1904, Serial No. 156,584. Application for reissue filed September 27, 1906. Serial No. 336,648.

*To all whom it may concern:*

Be it known that I, CHARLES A. WELLS, a citizen of the United States, residing at Chicago, in the county of Cook and State of Illinois, have invented certain new and useful Improvements in Electromagnetic Traction Devices and Emergency-Brakes, of which the following is a specification, reference being had to the accompanying drawings.

My invention relates to an electromagnetic traction mechanism for railways; and it has for its object the increase of the traction between the wheels of the locomotive or car and the rails and the production of a powerful emergency-brake, whereby the wheels are prevented from slipping on the rails by increasing the bearing effectiveness of the wheels upon said rails and the speed of the locomotive or car is promptly checked.

My invention consists of the parts and the constructions and combinations of parts which I will hereinafter describe and claim.

Figure 1:
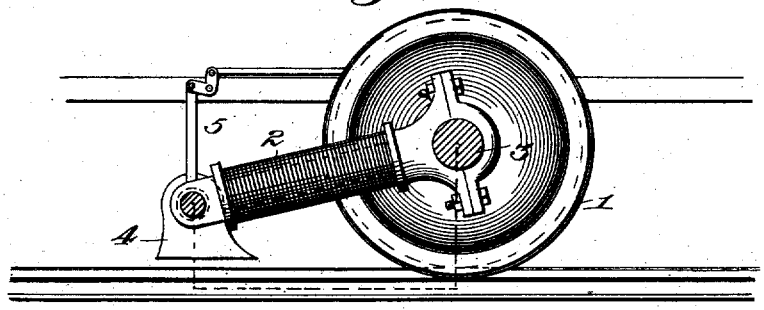
Figure 2:
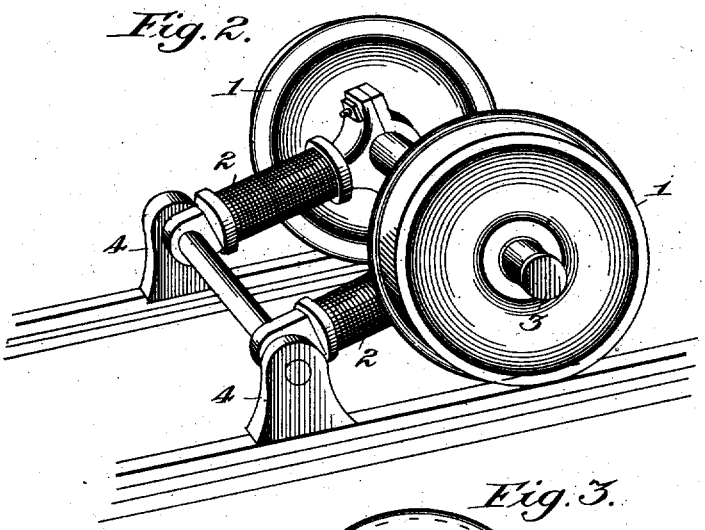
Figure 3:
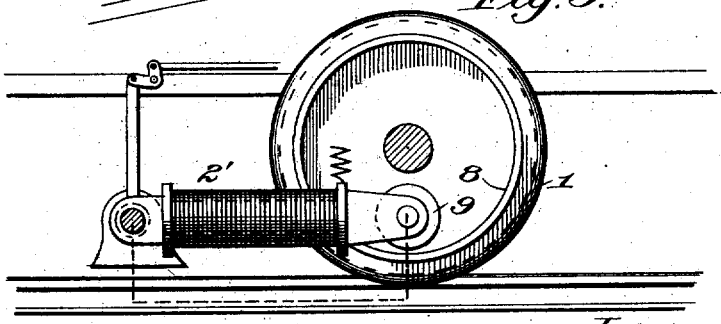

In the accompanying drawings, in which similar numerals of reference indicate like parts in the several figures, Figure 1 is a side elevation of a locomotive or car wheel and the means by which the traction between the wheel and rail is increased. Fig. 2 is a perspective view showing a pair of wheels and electromagnetic traction-increasing mechanism with emergency-brake shoes coacting therewith. Fig. 3 is a modification to be referred to.

In said drawing Fig. 1 the car-wheel 1 may represent the wheel of a locomotive, car, truck, or other wheeled vehicle adapted to travel on a rail or rails, said wheel mounted on the axle 3 in the usual or any well-known manner. Suspended from some part of the car—for instance, the axle, as shown—is a powerful electromagnet, which comprises a magnetizable core and a helix formed by winding wire around the core in the customary manner, said wire being designed to be connected with a suitable source of electrical supply, whereby upon turning on the current the core is magnetized. At the lower end of the core is pivotally secured a shoe 4, which is normally held slightly above the rail by any well-known and appropriate mechanism, one form of which is shown at 5 in Fig. 1 and which is capable of raising and lowering the shoe relative to the rail, said shoe being of a non-rotatable character and being formed with a flat face which is designed to bear directly and flatwise against the rail when the shoe is lowered into contact with the latter to form an emergency-brake. The electromagnet may be energized in an electric car by the same current that is used for the motor. In other cases any method used to produce electricity may be employed to energize the magnet. When the magnet is energized, it and the shoe form a horseshoe-magnet of much power, with the wheel 1 as one pole and the shoe 4 as the opposite pole, the section of rail between the two points completing the magnetic circuit. From this description it will be seen that the wheel 1 being in contact with the rail is strongly attracted to the rail, and the shoe being supported close to the rail is also attracted to the rail; but as it does not rest in contact with the rail the attraction acts the same as a weight on the frame supporting the shoe, thereby increasing the weight on the axles and adding increased cohesion to the wheels. It is therefore apparent that when the electromagnet is energized and attracted to the rail, so that it does not slip, it greatly assists the usual wheel traction, and then by dropping the shoe 4 into direct contact with the rail the shoe becomes a powerful track-brake and the braking power of the car is greatly increased, thereby adapting the shoe as an emergency-brake. The normal position of the shoe is slightly above the rail, and it is only when the occasion for an emergency-brake arises that said shoe is dropped into contact with the rail and its flat bearing-face, plus the magnetic power before alluded to, results in a prompt stoppage or slowing down of the locomotive or car.

In Fig. 2 I show a pair of wheels, magnets, and shoes, one for each rail; but the operation of the parts is the same as before set forth.

In Fig. 3 I illustrate a modified form of my device where the electromagnet 2′ instead of being bolted to the axle is capable of being suspended from the frame in any well-known manner, and the contact with the wheel 1 is obtained by a wheel or roller 9, journaled in the end of the electromagnet and adapted to travel on a flange 8 of said wheel 1, said wheel or roller 9 being held normally out of contact with the flange by any well-known form of spring connection which yields when the magnet is energized to allow the wheel or roller 9 to be drawn against the flange 8 to make the contact.

The advantages of my invention will be readily understood from the foregoing, and it will be apparent that a car or locomotive supplied with my traction-increasing and brake appliances will be enabled to ascend steep grades more readily and can be more quickly checked in descending grades; that on wet or slippery tracks the wheels will not slip, thereby doing away with the use of sand for tractive purposes; that the increased cohesion obtained will be a benefit to the ordinary brake, and when my shoe is used as a track-brake itself it will prove very effective in case of emergency or on a locomotive with a heavy train.

Having thus described my invention, what I claim as new, and desire to secure by Letters Patent, is—

1. The combination of a magnetizable wheel, an electro-magnet, a magnetizable shoe thereon in circuit with said wheel and movable into contact with the rail to form a brake, and means whereby said shoe is normally held proximate to and out of contact with the rail when obtaining magnetic cohesion.

2. The combination with electromagnetic traction-increasing devices including a magnetizable wheel and a magnet suspended from the axle thereof, of a non-rotatable and magnetizable shoe in circuit with the wheel and forming one of the poles of the magnet and normally held proximate to but out of direct contact with the rails, said shoe being, when magnetized and brought into direct contact with the rail, adapted to form therewith a rigid track-brake.

3. The combination with a magnetizable wheel and an electromagnet, said wheel forming one of the poles of the magnet, of a magnetizable shoe carried by the magnet and normally held proximate to, and out of direct contact with, the rails, said shoe being adapted when brought into contact with the rails, to have a sliding movement relative thereto as distinguished from a rolling movement thereon.

4. The combination of a magnetizable wheel, an electro-magnet, a non-rotatable magnetizable shoe thereon in circuit with the wheel and movable into contact with the rail to form a brake, and means whereby said shoe is normally held proximate to but out of contact with the rail.

5. The combination with track rails, of magnetizable wheels, electro-magnets having their cores hung on the axle of said wheels, a bar carried by the free ends of said cores, and non-rotatable magnetizable shoes on the ends of said bar having flat under sides adapted when lowered to bear upon the track rails.

In testimony whereof I hereunto set my hand.

CHARLES A. WELLS.

Witnesses:
WALTER S. FOGG,
T. L. MAYNARD.